May 23, 1939. H. MASBRUCH 2,159,508
MANIFOLD COOLED SKATING POND SPRAY
Filed Jan. 12, 1938
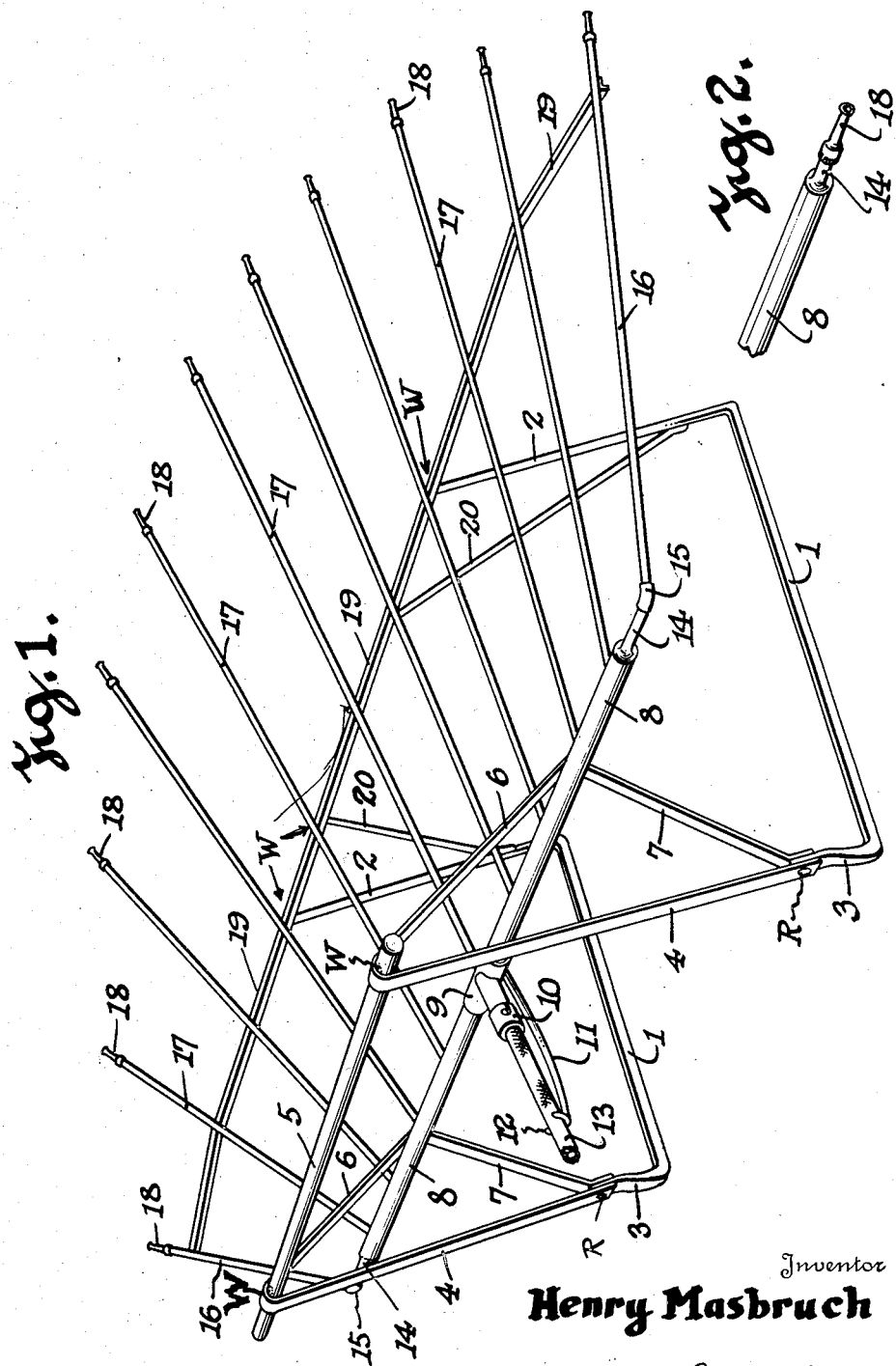
Inventor
Henry Masbruch
By Lester L. Sargent
Attorney Patented May 23, 1939

2,159,508

UNITED STATES PATENT OFFICE 2,159,508

MANIFOLD COOLED SKATING POND SPRAY

Henry Masbruch, Platteville, Wis.

Application January 12, 1938, Serial No. 184,661

3 Claims. (Cl. 299—56)

The object of my invention is to provide a novel manifold cooled skating pond spray for making skating ponds on vacant lots for the use of children and at very slight cost, and to make it possible to accomplish this result quickly without prolonged waiting for safe ice to form.

I attain these and other objects of my invention by the mechanism illustrated in the accompanying drawing, in which—

Figure 1 is a perspective view of the invention;

Fig. 2 is a detail perspective view of one of the nozzles.

Like numerals designate like parts in each of the views.

Referring to the accompanying drawing, I provide sled runners 1, terminating in upstanding front arms 2 and upstanding rear arms 3, the rear arms 3 being connected by a brace 4 with the hand rail 5 for guiding the device. Braces 6 extend on hand-rail 5 to a pipe 8, and braces 7 extend from pipe 8 to member 3. These are attached by suitable means as by the rivets R. Braces 4, 6 and 7 preferably are integral and may be affixed to rail 5 and pipes 8 by suitable means as by welding W. Pipes 8 are secured to a tee pipe connection 9, which in turn is secured by a coupling 10 to a hose 13 leading to a source of water supply. Affixed to tee connection 9 is a hose support 11 pivoting in fingers 12. The water distributing pipes 8 terminate in reducing pipes 14 which have connections 15 engaging them with radiating pipes 16. A plurality of radiating pipes 17 open out of the distributing pipes 8 and tee connection 9, as shown in Fig. 1. Pipes 16 and 17 are affixed to a supporting bar 19 in any suitable manner, preferably by welding W. The bar 19 is supported on the upper end and affixed to the upstanding front arms 2 of the runners 1. Braces 20 are affixed at their lower ends to arms 2 and at their upper ends to supporting bar 19. The radiating pipes 16 and 17 terminate in conventional nozzles 18 such as used on garden hose, whereby the nozzle may be adjusted to cause a spray.

The apparatus may be used to produce a skating rink on any park or vacant lot without expensive flooding of the site or the throwing up of lumber or banks and without loss of work by the water taking the frost out of the ground and then seeping away. In use the apparatus is pulled or pushed back and forth over the site with a fine spray flowing through the nozzles 18. The spray freezes as it hits the ground and the pond will form very speedily and the ice is perfectly smooth and of course absolutely safe. The machine throws a spray 40 feet wide, which in freezing weather will create a large skating rink in 12 hours. There are no air holes in the ice created by this mechanism.

What I claim is:

1. A manifold cooled skating pond spray, comprising a pair of sled runners, a supporting frame connected to the end of said sled runners, a pair of water distributing pipes, means for coupling said distributing pipes to a hose, a series of radiating pipes connected to the water distributing pipes and supported on the framework of the device, said water distributing pipes having adjustable spray nozzles.

2. A manifold cooled skating pond spray, comprising a pair of sled runners, a supporting frame connected to the end of said sled runners, a pair of water distributing pipes, means for coupling said distributing pipes to a hose, a series of radiating pipes connected to the water distributing pipes and supported on the framework of the device, said water distributing pipes having adjustable spray nozzles, a hand-rail for operating the device and braces affixed to the hand-rail and to other parts of the apparatus.

3. A manifold cooled skating pond spray, comprising a pair of sled runners terminating at each end in upstanding arms, a frame member welded to one of said upstanding arms and functioning as a support for radiating pipes, a pair of water distributing pipes, means for coupling said distributing pipes to a hose, a multiplicity of radiating pipes connected to the water distributing pipes and supported on the aforesaid frame member, said water distributing pipes having adjustable spray nozzles, a hand rail for operating the device, and braces welded to the hand rail and to the rear upstanding arms of the runners for bracing the device.

HENRY MASBRUCH.